(12) United States Patent
Vial et al.

(10) Patent No.: US 9,234,510 B2
(45) Date of Patent: Jan. 12, 2016

(54) HALL EFFECT THRUSTER

(71) Applicant: SNECMA, Paris (FR)

(72) Inventors: Vanessa Marjorie Vial, Vernon (FR); Joel Moyon, Gaillon (FR)

(73) Assignee: SNECMA, Paris (FR)

(*) Notice: Subject to any disclaimer, the term of this patent is extended or adjusted under 35 U.S.C. 154(b) by 0 days.

(21) Appl. No.: 14/376,991

(22) PCT Filed: Feb. 5, 2013

(86) PCT No.: PCT/FR2013/050242
§ 371 (c)(1),
(2) Date: Aug. 6, 2014

(87) PCT Pub. No.: WO2013/117856
PCT Pub. Date: Aug. 15, 2013

(65) Prior Publication Data
US 2015/0000250 A1 Jan. 1, 2015

(30) Foreign Application Priority Data
Feb. 6, 2012 (FR) ..................... 12 51055

(51) Int. Cl.
*F03H 1/00* (2006.01)
*B64G 1/40* (2006.01)

(52) U.S. Cl.
CPC ............ *F03H 1/0075* (2013.01); *F03H 1/0006* (2013.01); *F03H 1/0037* (2013.01); *F03H 1/0062* (2013.01); *F03H 1/0068* (2013.01); *B64G 1/405* (2013.01)

(58) Field of Classification Search
CPC ... F03H 1/0006; F03H 1/0037; F03H 1/0062; F03H 1/0068; F03H 1/0075; B64G 1/405
See application file for complete search history.

(56) References Cited

U.S. PATENT DOCUMENTS 5,838,120 A * 11/1998 Semenkin et al. ....... H05H 1/54
250/396 R
7,500,350 B1 3/2009 Jacobson et al.

FOREIGN PATENT DOCUMENTS

WO 97 21923 6/1997

OTHER PUBLICATIONS

Lazurenko, A. et al., "Recent Advances in Dual-mode Hall Effect Thruster Development", Recent Advances in Space Technologies, pp. 339-343, (Jun. 9, 2005) XP010838688.
Lazurenko, A. et al., "Dual-Mode Operation of Stationary Plasma Thrusters", Journal of Propulsion and Power, vol. 22, No. 1, pp. 38-48, (Jan.-Feb. 2006) XP055041195.
Ahedo, E. et al., "Influence of design and operation parameters on Hall thruster performances", Journal of Applied Physics, vol. 96, No. 2, pp. 983-992, (Jul. 15, 2004) XP012068136.
International Search Report Issued Jun. 14, 2013 in PCT/FR13/050242 Filed Feb. 5, 2013.

* cited by examiner

*Primary Examiner* — William H Rodriguez
*Assistant Examiner* — William Breazeal
(74) *Attorney, Agent, or Firm* — Oblon, McClelland, Maier & Neustadt, L.L.P.

(57) ABSTRACT

A Hall effect thruster including a downstream end of its annular channel presenting a cross-section that is variable to vary a thrust and a specific impulse of the thruster.

12 Claims, 2 Drawing Sheets

HALL EFFECT THRUSTER

BACKGROUND OF THE INVENTION

The present invention relates to the field of Hall effect thrusters.

The invention relates more particularly to a Hall effect thruster having an annular channel, an anode, an injection circuit, a magnetic circuit, and a cathode. The annular channel is defined by an outer wall and an inner wall that are coaxial around a central axis, and it presents a downstream end that is open and an upstream end that is closed. The anode is situated at the upstream end of the annular channel. The injection circuit is suitable for injecting a propulsion gas, e.g. xenon, into the annular channel. The magnetic circuit is suitable for generating a magnetic field at the downstream end of the annular channel. The cathode is situated at the outside of the downstream end of the annular channel.

In the present context, the terms "upstream" and "downstream" are defined relative to the normal flow direction of the propulsion gas in the direction defined by the central axis of the annular channel.

Typically, in the operation of such a Hall effect thruster, electrons are emitted by the cathode and attracted towards the anode at the end of the annular channel, which electrons are trapped by the magnetic field in spiral trajectories between the two walls, thereby forming a virtual cathode grid. Electrons escaping towards the anode from this magnetic enclosure enter into collision with atoms of the propulsion gas that is injected into the annular channel by the injection circuit, thereby creating an ionized plasma.

The positive ions of the plasma are accelerated by the electric field that exists between the anode and the virtual cathode grid formed by the cloud of electrons trapped by the magnetic field at the open end of the annular channel. Since the mass of each positive ion is much greater than the mass of an electron, the trajectory of the positive ions is hardly affected by the magnetic field. The ions of this plasma jet are finally neutralized downstream from the magnetic field by electrons emitted by the cathode or that have been produced by ionizing the plasma.

Hall effect thrusters were initially used in attitude and orbit control systems (AOCSs) for space vehicles, and in particular for the AOCSs of geostationary satellites. Hall effect thrusters enable a specific impulse ($I_{sp}$) to be obtained that is very high, being of the order of 1500 seconds (s), thus enabling the attitude and/or the position of the vehicle to be controlled very accurately with mass and complexity that are significantly smaller than when using conventional systems relying on inertial devices such as reaction wheels, for example, in combination with chemical thrusters for desaturating them.

Nevertheless, a Hall effect thruster with high specific impulse can normally only achieve thrust that is very low. Consequently, AOCSs incorporating Hall effect thrusters are conventionally associated with chemical thrusters for performing certain fast maneuvers, such as positioning or orbit transfer. That nevertheless presents the drawback of increasing the overall cost and complexity of the space vehicle, to the detriment of its reliability.

When performing characterization tests, and also in the SMART-1 experiment, it has been established that Hall effect thrusters can operate not only in a high specific impulse mode using the propulsion gas at a low flow rate and using a high electric voltage between the anode and the cathode, but that they can also be used, alternatively, in a high thrust mode, with a flow rate that is large and an electric voltage that is moderate. Nevertheless, the stability of the plasma jet and the efficiency of the thruster depend, amongst other things, on the density of the plasma in the annular channel. Consequently, present thrusters are optimized for a single mode of operation. Thus, replacing chemical thrusters for positioning and for orbit transfer would normally require Hall effect thrusters that are designed to operate in a high thrust mode, in addition to Hall effect thrusters of high specific impulse in the AOCS. The complexity of the space vehicle would thus not be reduced significantly.

In U.S. Pat. No. 7,500,350 B1, a Hall effect thruster is disclosed that has an annular channel presenting a downstream end that is open and an upstream end that is closed, an electric circuit, an injection circuit for injecting a flow of propulsion gas into the annular channel, and a magnetic circuit for generating a magnetic field at the downstream end of the annular channel. The electric circuit comprises an anode situated at the upstream end of the annular channel, a cathode downstream from the downstream end of the annular channel, and an electric voltage source between said anode and said cathode. The annular channel is defined by an inner wall and an outer wall that are coaxial around a central axis. In order to maintain a gap that is approximately constant between the inner and outer walls in spite of them being gradually eroded away during the operation of the thruster, the inner wall and/or the outer wall are movable in the axial direction, and the thruster also has an actuator for moving said inner wall and/or said outer wall. Nevertheless, that document does not mention how to operate the Hall effect thruster both in high thrust mode and in high specific impulse mode.

OBJECT AND SUMMARY OF THE INVENTION

The invention seeks to propose a Hall effect thruster capable of operating both in high thrust mode and in high specific impulse mode.

In at least a first embodiment, this object is achieved by the facts that the inner wall is movable and presents a diameter that decreases in the downstream direction, and that the thruster also has a control unit that is connected at least to the electric circuit, and to the propulsion gas injection circuit, and to said actuator, and configured so as to vary said flow and/or said voltage and to regulate the position of the movable inner wall in order to adapt the cross-section of the downstream end of the annular channel as a function of said variable flow and/or of said variable voltage in order to maintain the plasma density at the downstream end of the annular channel within a predetermined range.

In at least a second embodiment, this object is achieved by the facts that the outer wall is movable and presents a diameter that increases in the downstream direction, and that the thruster also has a control unit that is connected at least to the electric circuit, to the propulsion gas injection circuit, and to said actuator, and that is configured so as to vary said flow and/or said voltage and to regulate the position of the movable outer wall in order to adapt the cross-section of the downstream end of the annular channel as a function of said variable flow and/or of said variable voltage in order to maintain the plasma density at the downstream end of the annular channel within a predetermined range.

In both configurations, these provisions enable the thickness of the downstream end of the annular channel to be varied by moving the movable wall axially so as to maintain a constant plasma density at the outlet from the annular channel with varying flow rates of the propulsion gas. This thus produces a Hall effect thruster that is particularly adaptable, being capable of functioning in a high thrust mode with a high flow rate of plasma delivered over a large outlet section from the annular channel, and also in a high specific impulse mode with a low flow rate of plasma passing through a narrower outlet section from the annular channel.

In order to move the movable wall axially, and by way of example, said actuator of the movable wall may be a piezoelectric actuator for actuating the movable wall. In this application, such a piezoelectric actuator presents the advantage of being compatible with use in the environment of space, with a long lifetime, and without interference from the high electric and magnetic fields that exist within a Hall effect thruster, while nevertheless providing very great reaction speed. In particular, the piezoelectric actuator may be an ultrasonic motor. In the present context the term "ultrasonic motor" means an actuator having a rotor and a piezoelectric stator on which a traveling ultrasound wave can be induced electrically, with the crest of the wave in contact with the rotor driving it in its direction of advance. Although ultrasonic motors are usually rotary, with rotors and stators that are annular, in the present application, it is also possible to envisage using a linear ultrasonic motor with a rotor and a stator that are straight. The term "rotor" continues to be used for the movable part if it is movable in a linear direction rather than a rotary direction. The ultrasonic motor presents the specific advantage of providing relatively high torques and forces, while not producing interference in the Hall effect thruster, which has operating frequencies that are of the order of 30 kilohertz (kHz), or in the telecommunications equipment of the space vehicle, which operates at frequencies of gigahertz order. The operating frequency of ultrasonic motors is of the order of 30 megahertz (MHz).

In particular, the inner and outer walls may be made of ceramic material, which is particularly appropriate because of its electrical, magnetic, and corrosion-resistance characteristics.

The present invention also provides a space vehicle incorporating at least one such Hall effect thruster, and it also provides a method of regulating thrust in such a Hall effect thruster.

In at least one implementation of the thruster regulation method, the flow of propulsion gas injected into the annular channel by the circuit and/or an electric voltage between said anode and cathode change as a function of a desired thrust, and the position of the movable wall is regulated so as to adapt the cross-section of the downstream end of the annular channel as a function of said variable flow and/or of said variable voltage in such as a manner as to maintain the plasma density at the downstream end of the annular channel in a predetermined range. It is thus possible to vary the operation of the Hall effect thruster between a high thrust mode and a high specific impulse mode without affecting the stability of the plasma jet.

BRIEF DESCRIPTION OF THE DRAWINGS

The invention can be well understood and its advantages appear better on reading the following detailed description of two embodiments given as non-limiting examples. The description refers to the accompanying drawings, in which.

DETAILED DESCRIPTION OF THE INVENTION

Figure 1A:
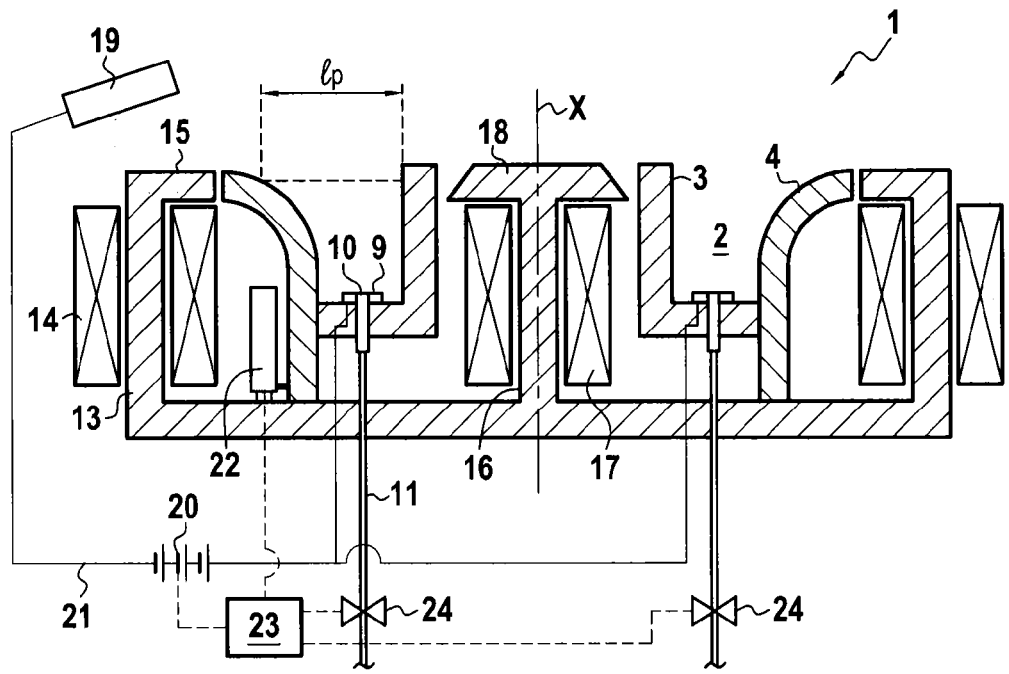
FIG. 1A is a diagrammatic axial section view of a Hall effect thruster in a first embodiment in a high thrust mode.
Figure 1B:
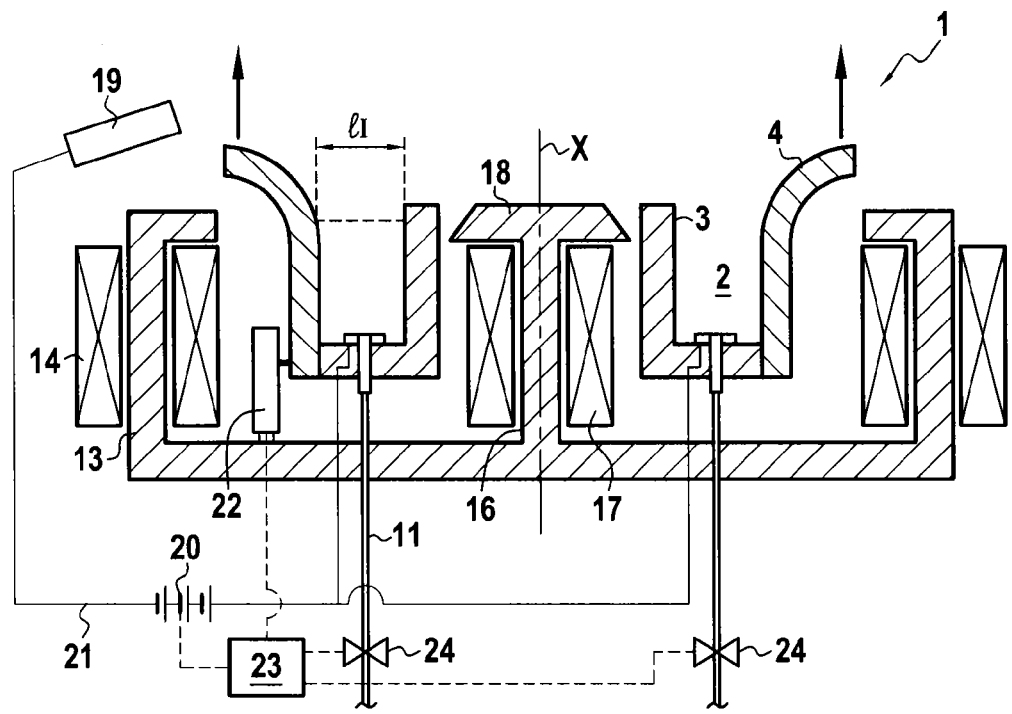
FIG. 1B is a diagrammatic axial section view of the FIG. 1A Hall effect thruster in a high specific impulse mode.

FIGS. 1A and 1B show two different positions of the same Hall effect thruster 1 in a first embodiment. This thruster 1 has an annular channel 2 defined by an inner wall 3 and an outer wall 4 made of ceramic material, which walls are coaxial about a central axis X. The annular channel 2 presents a downstream end that is open and an upstream end that is closed. At its upstream end, the annular channel 2 also presents nozzles 10 for injecting propulsion gas into the annular channel 2. The nozzles 10 are connected to a propulsion gas source by an injection circuit 11 including flow rate regulator devices 24. By way of example, these devices 24 may comprise a pencil valve or a thermo-capillary, i.e. a capillary with heater means making it possible actively to vary its temperature and thus the flow rate that it passes. Such flow rate regulator devices may also be associated with passive flow restrictors. The propulsion gas may be xenon, which presents the advantages of high molecular weight and comparatively low ionization potential. Nevertheless, as in other Hall effect thrusters, a wide variety of propulsion gases could be used.

The thruster 1 also has a magnetic circuit. This magnetic circuit comprises magnetic cores 13 arranged around the outer wall 4 and themselves surrounded by coils 14, the cores terminating in an outer pole 15 in the proximity of the open end of the annular channel 2. The magnetic circuit also has a central magnetic core 16 in the center of the thruster 1 and surrounded by coils 17, the central core terminating in an inner pole 18 of polarity opposite to that of the outer pole 15 and situated facing it in the proximity of the open end of the annular channel 2 so as to generate a radial magnetic field between them. The thruster 1 also has an electrical circuit 21 with an anode 9 situated at the upstream end of the annular channel 2, a cathode 19 situated downstream from the open end of the annular channel 2, and an electric voltage source 20 between the anode 9 and the cathode 19. Although in the embodiments shown, the cathode 19 is a hollow cathode, it is possible as an alternative to use other types of cathode.

The annular channel 2 may in particular be axisymmetric. Nevertheless, it is possible as an alternative to envisage other shapes that are not axisymmetric, for example having a cross-section that is oval or in the shape of a hippodrome.

In operation, an electric voltage typically of the order of 150 volts (V) to 800 V when xenon is used as the propulsion gas, is established between the hollow cathode 19 downstream from the downstream end of the annular channel 2 and the anode 9 at the end of the annular channel 2. The hollow cathode 19 then begins to emit electrons, with a large fraction of them being trapped in a magnetic enclosure formed by the magnetic field, which enclosure is adapted to the desired performance and to the propulsion gas being used, with the field typically being of the order of 100 gauss (G) to 300 G when xenon is used as the propulsion gas. The electrons trapped in the magnetic enclosure thus form a virtual cathode grid. An electric field is thus generated in the annular channel between the anode 9 and the virtual cathode grid.

High energy electrons (typically having energy in the range 10 electron volts (eV) to 40 eV) escape from the magnetic enclosure going toward the anode 9, while the propulsion gas is injected into the annular channel 2 via the nozzles 10. Impacts between these electrons and propulsion gas atoms cause the propulsion gas to become ionized, and then to be accelerated by the electric field towards the downstream end of the annular channel 2. Since the mass of an ion of the propulsion gas is several orders of magnitude greater than the mass of an electron, the magnetic field does not confine these ions in the same manner. The thruster 1 thus generates a plasma jet that is ejected through the downstream end of the annular channel 2 in order to produce thrust that is substantially in alignment with the central axis X.

In this thruster 1 of the first embodiment, the outer wall 4 is movable in an axial direction and it presents a diameter that increases going downstream. In contrast, the inner wall 3 is stationary. Thus, when the outer wall 4 is retracted in the axial direction, as in the position shown in FIG. 1A, the inner and outer walls 3 and 4 present a relatively large radial gap $l_p$ and thus a large cross-section for passing the plasma jet leaving the annular channel 2. In contrast, when the outer wall 3 is advanced in the downstream direction, as shown in FIG. 1B, the inner and outer walls 3 and 4 present at the outlet from the annular channel 2 a radial gap $l_i$ that is smaller and that thus presents a smaller cross-section for passing the plasma jet. Thus, the position shown in FIG. 1A distributes the plasma jet over a greater outlet area at the downstream end of the annular channel 2 and is therefore more appropriate for a plasma jet of large flow rate, and thus of high thrust. In contrast, in the position shown in FIG. 1B, the outlet area from the annular channel 2 is smaller, thereby enabling the stability of the plasma jet to be maintained even at small flow rates and higher electric voltages, which is therefore more appropriate for a mode of operation with high specific impulse.

In order to move the outer wall 4 axially, it may be actuated by an actuator 22 having an ultrasonic motor, which can easily be incorporated in the thruster 1 because of its small size. Although an ultrasonic motor is specifically proposed in this embodiment, other types of actuator could be envisaged as alternatives, in particular piezoelectric actuators.

A control unit 23 connected at least to the actuator 22, to the devices for regulating the flow rate of the propulsion gas of the circuit 11, and to the source of electric voltage between the anode 9 and the cathode 19 can regulate the flow rate of propulsion gas delivered by the circuit 11, the electric voltage between the cathode 19 and the anode 9, and the axial position of the outer wall 4 in such a manner as to vary the thrust and the specific impulse of the thruster 1. This control unit 23 comprises a data processor and a memory storing charts specifying the axial position of the outer wall 4 that corresponds to an operating point of the thruster 1 as defined by a current/voltage pair of the electrical power supply connected to the anode 9 and the cathode 19.

Figure 2A:
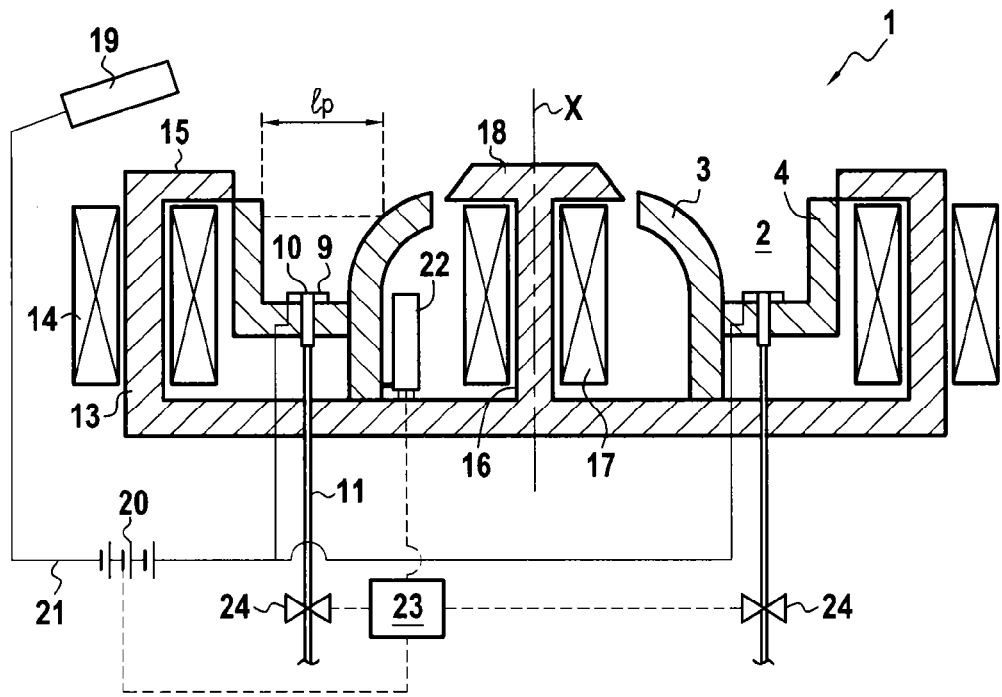
FIG. 2A is a diagrammatic axial section view of a Hall effect thruster in a second embodiment in a high thrust mode.
Figure 2B:
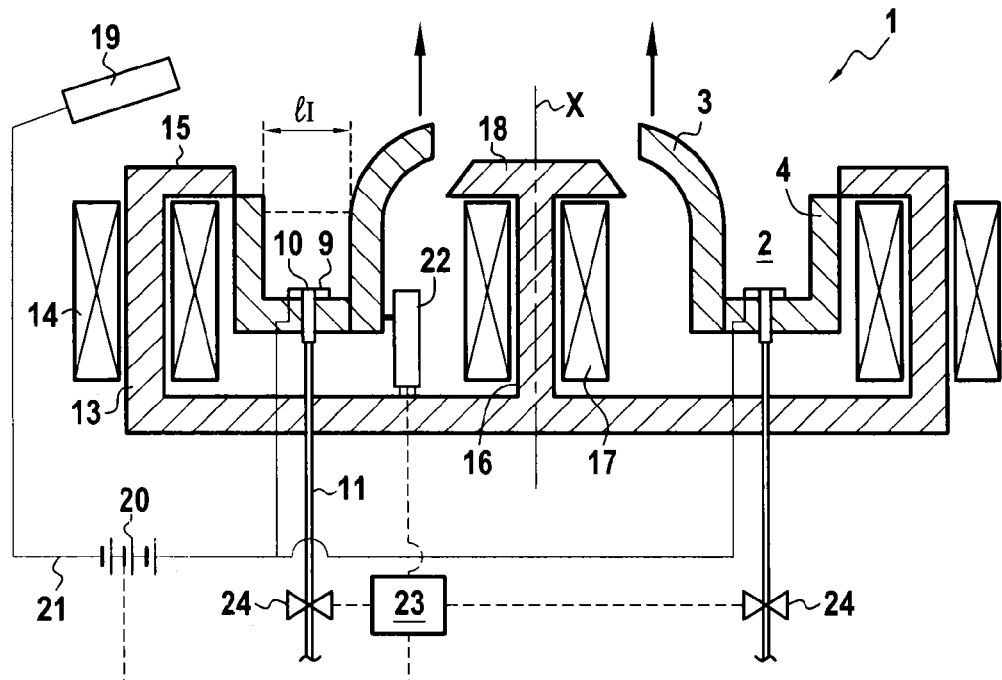
FIG. 2B is a diagrammatic axial section view of the FIG. 2A Hall effect thruster in a high specific impulse mode.

Although in this first embodiment it is the outer wall 4 that is the movable wall, in other embodiments it is possible for the inner wall 3 to be movable, instead of or as well as the outer wall 4. Thus, in the second embodiment shown in FIGS. 2A and 2B, the outer wall 4 is stationary while the inner wall 3 is movable in the axial direction. The other elements of the thruster 1 are identical to those of the first embodiment and they are given the same reference numbers in the drawings. In this second embodiment, the inner wall 4 presents a diameter that decreases going in the downstream direction. Thus, as in the first embodiment, moving the movable wall axially makes it possible to go from a high thrust mode of operation as shown in FIG. 2A to a high specific impulse mode of operation as shown in FIG. 2B, and vice versa.

In both embodiments, a portion of the plasma jet can be ejected at an angle relative to the axial direction that is considerable (e.g. up to 45°). It is therefore appropriate to adapt the shape of the walls 3 and 4 so as to avoid as much as possible the erosion that is caused by these ions. Thus, by way of example, in the embodiments shown, the shape of the movable walls follows a circular development, so that they reach an angle greater than 45° relative to the central axis X at their distal ends.

Although the present invention is described with reference to specific embodiments, it is clear that other modifications and changes may be made on these embodiments without going beyond the general scope of the invention as defined by the claims. In addition, the individual characteristics of the various embodiments described may be combined in additional embodiments. For example, both the inner and the outer wall could be movable axially. Consequently, the description and the drawings should be considered as being illustrative rather than restrictive.

The invention claimed is:

1. A Hall effect thruster comprising:
   an annular channel defined by an inner wall and an outer wall, wherein the inner wall and the outer wall are coaxial about a central axis, the annular channel having a downstream end that is open and an upstream end that is closed, and the inner wall being movable in an axial direction and having a diameter that decreases in a downstream direction;
   an actuator for moving the inner wall in the axial direction;
   an electric circuit including an anode situated at the upstream end, a cathode at the downstream end, and an electric voltage source configured to supply a voltage between the anode and cathode;
   an injection circuit for injecting a mass flow of propulsion gas into the annular channel;
   a magnetic circuit for generating a magnetic field at the downstream end; and
   a control unit that is connected to the electric circuit, to the injection circuit, and to the actuator, and that is configured to vary the mass flow and/or the voltage and to regulate an axial position of the inner wall relative to the outer wall as a function of the mass flow and/or of the voltage to adapt a cross-section of the downstream end to maintain a plasma density at the downstream end.

2. The Hall effect thruster according to claim 1, wherein the actuator is a piezoelectric actuator.

3. The Hall effect thruster according to claim 2, wherein the piezoelectric actuator is an ultrasonic motor.

4. The Hall effect thruster according to claim 1, wherein the inner wall and the outer wall are made of ceramic material.

5. A Hall effect thruster comprising:
   an annular channel defined by an inner wall and an outer wall, wherein the inner wall and the outer wall are coaxial about a central axis, the annular channel having a downstream end that is open and an upstream end that is closed, and the outer wall being movable in an axial direction and having a diameter that increases in a downstream direction;
   an actuator for moving the outer wall in the axial direction;
   an electric circuit including an anode situated at the upstream end, a cathode at the downstream end, and an electric voltage source configured to establish a voltage between the anode and cathode;
   an injection circuit for injecting a mass flow of propulsion gas into the annular channel; a magnetic circuit for generating a magnetic field at the downstream end; and
   a control unit that is connected to the electric circuit, to the injection circuit, and to the actuator, and configured to vary the mass flow and/or the voltage and to regulate an axial position of the outer wall relative to the inner wall to adapt a cross-section of the downstream end as a function of the mass flow and/or of the voltage to maintain a plasma density at the downstream end.

6. The Hall effect thruster according to claim 5, wherein the actuator is a piezoelectric actuator.

7. The Hall effect thruster according to claim 6, wherein the piezoelectric actuator is an ultrasonic motor.

8. The Hall effect thruster according to claim 5, wherein the inner wall and the outer wall are made of ceramic material.

9. A space vehicle including at least one Hall effect thruster comprising:
 an annular channel defined by an inner wall and an outer wall, wherein the inner wall and the outer wall are coaxial about a central axis, the annular channel having a downstream end that is open and an upstream end that is closed, and the inner wall being movable in an axial direction and having a diameter that decreases in a downstream direction;
 an actuator for moving the inner wall in the axial direction;
 an electric circuit including an anode situated at the upstream end, a cathode at the downstream end, and an electric voltage source configured to establish a voltage between the anode and cathode;
 an injection circuit for injecting a mass flow of propulsion gas into the annular channel; a magnetic circuit for generating a magnetic field at the downstream end; and
 a control unit that is connected to the electric circuit, to the injection circuit, and to the actuator, and that is configured to vary the mass flow and/or the voltage and to regulate an axial position of the inner wall relative to the outer wall as a function of the mass flow and/or of the voltage to adapt a cross-section of the downstream end to maintain a plasma density at the downstream end.

10. A method of regulating a Hall effect thruster comprising:
 an annular channel defined by an inner wall and an outer wall, wherein the inner wall and the outer wall are coaxial about a central axis, the annular channel having a downstream end that is open and an upstream end that is closed, and the inner wall being movable in an axial direction and having a diameter that decreases in a downstream direction;
 an actuator for moving the inner wall in the axial direction;
 an electric circuit including an anode situated at the upstream end, a cathode at the downstream end, and an electric voltage source configured to establish a voltage between the anode and cathode;
 an injection circuit for injecting a mass flow of propulsion gas into the annular channel;
 a magnetic circuit for generating a magnetic field at the downstream end; and
 a control unit that is connected to the electric circuit, to the injection circuit, and to the actuator, wherein: the mass flow and/or the voltage changes as a function of a target thrust; and
 an axial position of the inner wall is modified relative to the outer wall to adapt a cross-section of the downstream end as a function of the mass flow and/or of the voltage to maintain a plasma density at the downstream end.

11. A space vehicle including at least one Hall effect thruster comprising:
 an annular channel defined by an inner wall and an outer wall, wherein the inner wall and the outer wall are coaxial about a central axis, the annular channel having a downstream end that is open and an upstream end that is closed, and the outer wall being movable in an axial direction and having a diameter that increases in a downstream direction;
 an actuator for moving the outer wall in the axial direction;
 an electric circuit including an anode situated at the upstream end, a cathode at the downstream end, and an electric voltage source configured to establish a voltage between the anode and cathode;
 an injection circuit for injecting a mass flow of propulsion gas into the annular channel;
 a magnetic circuit for generating a magnetic field at the downstream end; and
 a control unit that is connected to the electric circuit, to the injection circuit, and to the actuator, and that is configured to vary the mass flow and/or the voltage and to regulate an axial position of the outer wall relative to the inner wall as a function of the mass flow and/or of the voltage to adapt a cross-section of the downstream end to maintain a plasma density at the downstream end.

12. A method of regulating a Hall effect thruster comprising:
 an annular channel defined by an inner wall and an outer wall, wherein the inner wall and the outer wall are coaxial about a central axis, the annular channel presenting a downstream end that is open and an upstream end that is closed, and the outer wall being movable in an axial direction and presenting a diameter that increases in a downstream direction;
 an actuator for moving the outer wall in the axial direction;
 an electric circuit including an anode situated at the upstream end, a cathode at the downstream end, and an electric voltage source configured to establish a voltage between the anode and cathode;
 an injection circuit for injecting a mass flow of propulsion gas into the annular channel;
 a magnetic circuit for generating a magnetic field at the downstream end; and
 a control unit that is connected to the electric circuit, to the injection circuit, and to the actuator;
 wherein: the mass flow and/or the voltage changes as a function of a target thrust; and
 an axial position of the outer wall is modified relative to the inner wall to adapt a cross-section of the downstream end as a function of the mass flow and/or of the voltage to maintain a plasma density at the downstream end.

* * * * *